Sept. 15, 1959  W. C. NEWSOM  2,904,284
CONTROL DEVICE FOR REELING CABLE AND THE LIKE
Filed April 18, 1955  2 Sheets-Sheet 2
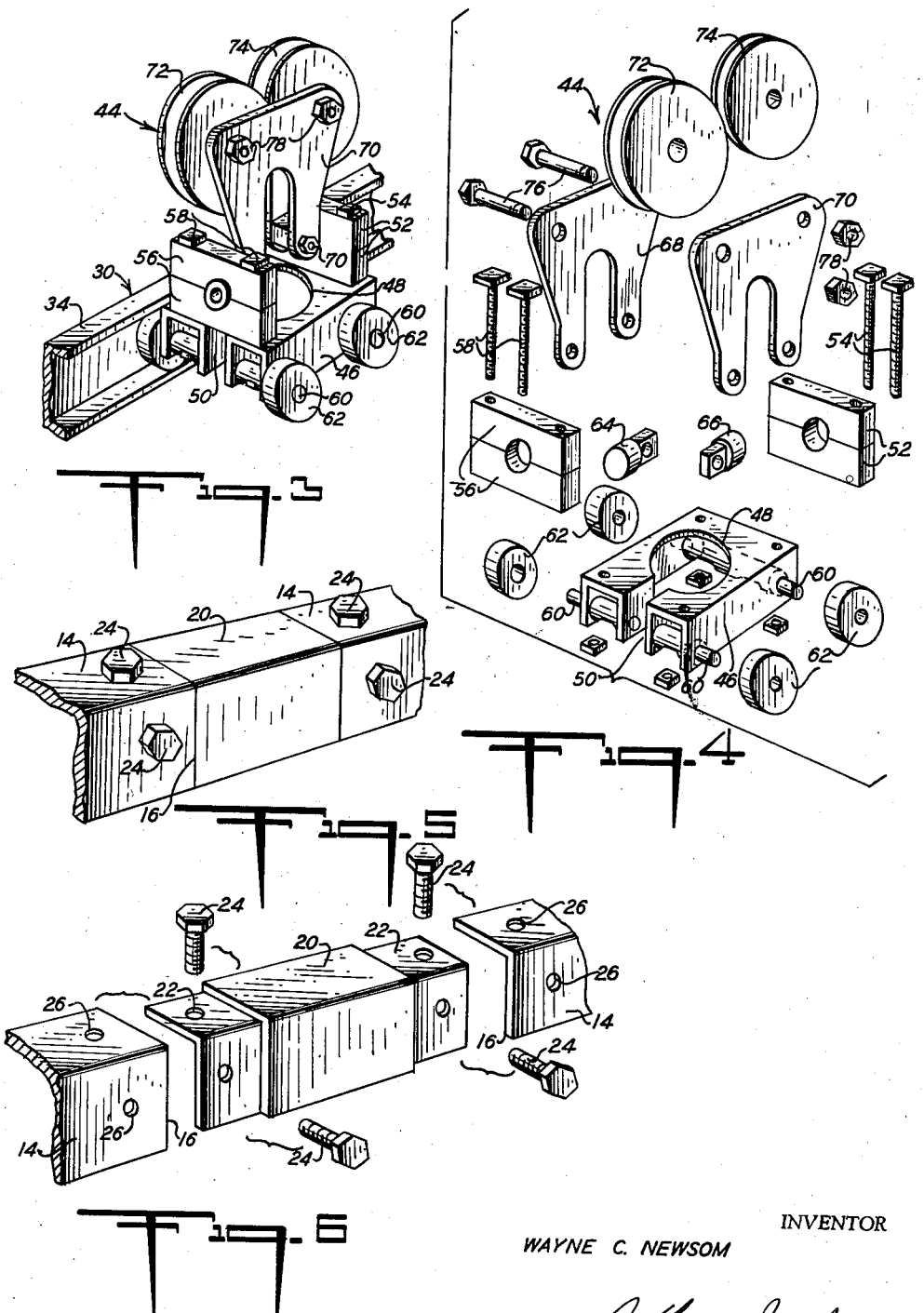
INVENTOR
WAYNE C. NEWSOM
BY
ATTORNEY

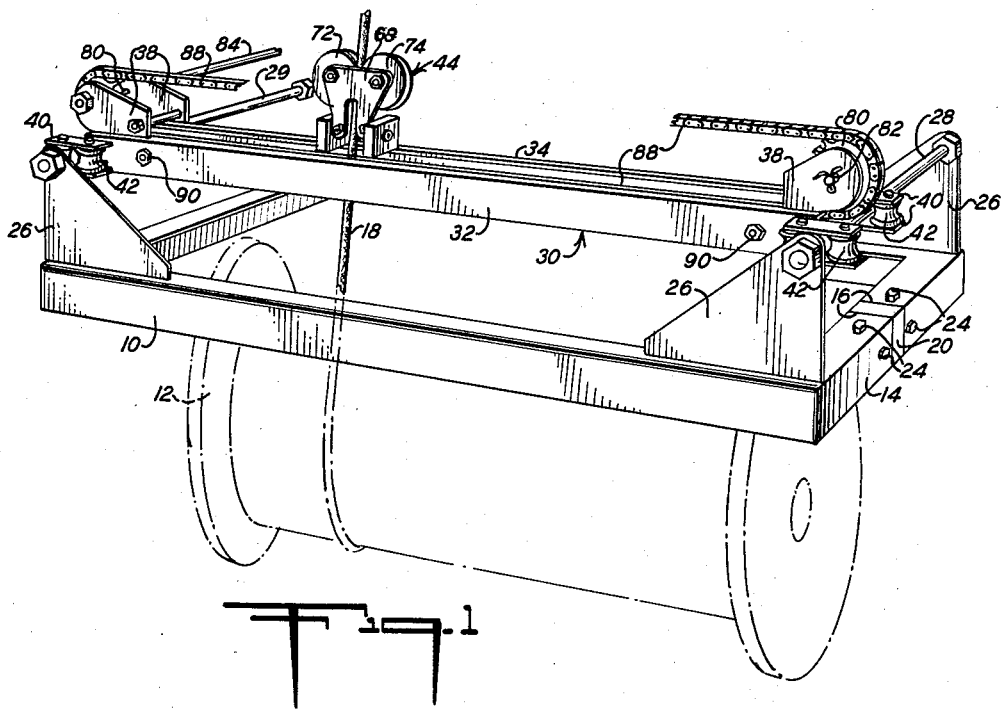

United States Patent Office 2,904,284
Patented Sept. 15, 1959

2,904,284

CONTROL DEVICE FOR REELING CABLE AND THE LIKE

Wayne C. Newsom, Bakersfield, Calif.

Application April 18, 1955, Serial No. 501,813

3 Claims. (Cl. 242—158)

This invention relates to improvements in a control device for reeling cable and the like and, but without restriction thereto, is highly adapted for use with reels and cables used in the oil fields. However, the device may be used wherever ropes or lines are spooled or wound upon drums or reels. Also, to simplify the description, the term cable, as used herein, will be considered to be generic to woven or plaited metalic cables, ropes of various kinds, and the like.

In oil fields particularly, various kinds of cables are used. For example, a hoisting rig may include several drums or reels, respectively for coiling hoisting lines by which the drilling tool and bailing or swabbing devices are raised and lowered within an oil well. The cable attached to the bailing or swabbing devices frequently is referred to as a sand line. The sand line or cable usually is smaller in diameter than the hoisting cable for the drilling tool. These cables usually are woven or braided from steel wire. The larger diameter hoisting cable accordingly is generally stiffer than the sand line or cable and such added stiffness frequently results in the cable wrapping itself regularly upon a reel without any particular assistance from an operator or other mechanism. However, the smaller diameter and more flexible sand line or cable usually requires the use of some means for assuring the wrapping of the cable in even layers upon the reel. Otherwise, after possibly one or two regular layers, the sand cable will tend to pile up upon itself irregularly.

Such irregular piling or coiling of a cable upon a reel is injurious to it and frequently is unsafe particularly when the cable builds up upon itself in one place along the reel.

Further, sand lines or cables frequently are extremely long, sometimes as much as three miles in length since they are used to lower bailing or swabbing devices into wells of corresponding depths. Hence, to render the cable as safe as possible, as well as use the reel capacity to maximum advantage, it is most desirable that the cable be coiled in even layers upon the reel.

It is the principal object of the present invention to provide a control device for guiding a cable or line while being reeled upon the drum or reel of a number of different types of conventional hoisting machine or rig so as to permit the cable or line to be evenly coiled in uniform layers upon the reel. One of the more important characteristics of the control device is that it may be attached to such conventional hoisting machine and receive the cable which, at the time, may be mounted in use and thereby not require that the end of the cable be passed through the control device as now is frequently necessary in spooling control devices presently in use.

Another object of the invention is to provide a control device which is simple in construction and yet is rugged and durable so as to be capable of controlling the spooling or coiling of cables of various sizes and long lengths which are subjected to extremely great tensile stresses.

Still another object of the invention is to provide actuating mechanism for the control device which may be operated with relatively little effort by an attendant and also afford relative safety to the attendant as well as the cable and hoisting machine.

Other objects of the invention as well as details of the foregoing objects and of the structure comprising the invention are set forth in the following specification and illustrated in the accompanying drawings comprising a part thereof.

In the drawings:

Fig. 1 is a perspective view of a control device for reeling cable, said device embodying the principles of the present invention and being illustrated in an exemplary manner relative to a reel, it being understood that the reel is supported and actuated by a conventional hoisting machine, said machine not being illustrated.

Fig. 2 is a top plan view of the control device illustrated in Fig. 1.

Fig. 3 is a fragmentary perspective view of the cable engaging unit comprising part of the control device illustrated in Figs. 1 and 2.

Fig. 4 is an exploded view of the cable engaging unit shown in Fig. 3 and illustrating in detail the various components of said unit.

Fig. 5 is a fragmentary perspective view of one portion of the base frame of the control device.

Fig. 6 is an exploded perspective view of the components of the portion of the base frame illustrated in Fig. 5.

Referring to Fig. 1 particularly, the control device comprising the present invention is embodied in an exemplary illustration which includes a preferred arrangement of the components of the device. Said device comprises a base frame 10 which is positionable relative to and also attachable to a conventional hoisting machine including a drum or reel 12, other parts of the hoisting machine not being illustrated in order to simplify the present illustration and description. The base frame 10 may be formed from any suitable structural elements such as channels or angle irons and the components of the frame are connected at the corners thereof. This base frame may be made in a suitable number of conventional sizes in order to adapt it to different types and sizes of hoisting machines. It will be seen that the base frame normally is closed but, for example, the end member 14 is provided with a space 16 through which the line or cable 18 may be introduced into the confines of frame 10, particularly when the control device is being mounted relative to a hoisting machine upon which a cable is installed and under tension, for example.

In order that the frame 10 may be rigid, regardless of the space 16 which is formed in end member 14, said space 16 normally is closed by filler member 20. If for example the end member 14 is formed from angle iron, the filler member 20 also may be a short length of the same size of angle iron and inwardly offset connecting ends 22 are fixed to and project from filler member 20 so as to extend into the end member 14 and be firmly connected thereto by any suitable means such as cap screws 24 which pass through suitable openings 26 in end member 14 and are threaded into tapped holes formed in the connecting ends 22 as will be obvious from Figs. 5 and 6. In view of this arrangement, the components of the frame 10 may, if desired, be welded together at the ends thereof.

Extending upward from the corners of frame 10 are a plurality of upright plates 26 which are fixed to the frame 10 and, at the upper ends thereof, respectively support a pair of guide bars 28 and 30, the ends of which are fixed by any means such as nuts to the upright plates 26.

The guide bars 28 and 29 afford support and also guided movement for supporting means 30 which comprises a unit formed from, preferably, a pair of channel irons 32 and 34 which are spaced apart transversely to the unit, the opposite ends of the channel members 32 and 34 being held connected in spaced relationship by a pair of short bars or rods 36 which extend between upstanding ears 38 which are fixed by suitable means such as bolts 39 to the channel members 32 and 34 as is clearly shown in Fig. 2.

Suitable extensions 40 are fixed to and project horizontally from the channel members 32 and 34, there being spaced pairs of these extensions between which concave, pulley-like rollers 42 are rotatably mounted, in pairs, so as to engage opposite sides of the guide bars 28 and 29 and thereby support the opposite ends of the supporting unit 30 for relatively anti-friction movement transversely in opposite directions back and forth over the opening enclosed by base frame 10.

Supported by the unit 30 for movement longitudinally thereof is a cable engaging and guiding unit 44, details of which are best illustrated in Figs. 3 and 4. Unit 44 comprises a base block 46 which has a central cable receiving opening 48 and a slot 50 leading thereinto. Said slot receives the cable to permit the same being disposed within opening 48 as will be hereinafter described. A pair of bearing blocks 52 may be permanently secured to one end of base block 46 by suitable bolts 54. A second pair of bearing blocks 56 are detachably secured to the opposite end of base block 46 by bolts 58, the bearing blocks 56 extending across slot 50 in base block 46.

Base block 46 also is provided with pairs of oppositely projecting trunnion axles 60 which rotatably support anti-friction rollers 62. The rollers 62 on opposite sides of base block 46 respectively are received within the channels 32 and 34 so as to facilitate movement of cable engaging and guiding unit 44 along the supporting unit 30.

The bearing openings in bearing blocks 52 and 56 respectively receive short trunnions 64 and 66. A pair of U-shaped plates 68 and 70 have normally lower ends which are apertured as are the inner end trunnions 64 and 66 for purposes of receiving bolts 70, see Fig. 3, for purposes of uniting said plates and trunnions, the trunnion 64 being removable when its bolt 70 is disconnected for purposes of assembling the unit 44 relative to the cable 18. A pair of grooved rollers 72 and 74 are rotatably supported by bolt-like axles 76 which extend through suitable apertures in the normally upper ends of plates 68 and 70 and the central bearing openings in the groove rollers 72 and 74. Nuts 78 are fastened to the outer ends of the axle 76.

From the foregoing, it will be seen that not only is the cable engaging and guiding unit 44 movable in opposite directions along the supporting means 30 but the sub-unit comprising plates 68 and 70, and grooved rollers 72 and 74 is pivotally movable about a horizontal axis constituting the common axis of trunnions 64 and 66, relative to the base block 46 of unit 44. By this means, wear upon the groove rollers 72 and 74 particularly is minimized. It is to be understood also that, if preferred, anti-friction bearings may be provided between the rollers 72 and 74 and their axles 76, as well as between trunnions 64 and 66 and the bearings therefor in the bearing blocks 52 and 56.

To effect controlled movement of the cable engaging and guiding unit 44 relative to the channels 32 and 34 of supporting means 30, a pair of circular members, comprising either pulleys or sprocket wheels 80, are rotatably supported between the upstanding ears 38 at opposite ends of supporting means 30, one of said rotatable means being supported by a pin 82, for example, extending between one pair of ears 38, and the other rotatable member 80 being fixed to a shaft 84 supported by suitable bearings in the other pair of ears 38, whereby the shaft 84 may be rotated by any suitable means such as a hand wheel 86 which may be connected either directly or by a universal joint, if desired, to shaft 84.

Extending around the rotatable members 80 is a flexible member such as a V-belt of suitable strength or a sprocket chain 88. One end of the chain or belt 88 is fixed to one of a plurality of suitable anchor members 89 respectively fixed to opposite ends of base block 46, as shown in Fig. 2, and then extends around and between both of the rotatable members 80, the other end of the belt or chain 88 being connected to the anchor member 89 on the opposite end of base block 46. By such arrangement, as the shaft 84 is rotated by hand wheel 86 in either direction, the cable engaging and guiding unit 44 will be moved in corresponding direction relative to the supporting means 30 by the propelling means described hereinabove and such means does not interfere with the rocking of cable guiding unit 44.

In order to install the control device comprising the present invention relative to a hoisting machine or rig which, for example is strung with a cable 18 in place and under tension, filler member 20 is removed from end member 14 of the frame 10 so as to permit the frame to be introduced around cable 18. Guide bar 28 also is removed temporarily, as is pin 82, so as to permit the cable to be introduced between the channel members 32 and 34. In the preferred construction, the channel members 32 and 34 also are maintained in fixed spaced relationship by bolts 90 which extend between the channel members and a spacer sleeve, not shown, surrounds each bolt 90 and abuts at the ends thereof against the inner surfaces of the channel members. When introducing the cable, the bolt 90 and its spacer sleeve nearest the pin 82 also will be removed when introducing the cable.

Having introduced the cable within the confines of supporting means 30, it is now necessary to dispose the cable within engaging and guiding unit 44. It will be assumed that the end of space block 46 having slot 50 therein is disposed toward the end of supporting means 30 which supports pin 82. Bolts 58 now are removed to permit separation of bearing block 52 from base block 46. The bolt 70 which connects trunnion 64 to the side plates 68 next is removed so as to free trunnion 64 from the side plates. Also, the bolt axle 76 which supports grooved roller 72 likewise is removed as well as roller 72. The unit 44 now is in condition to have the cable 18 moved through slot 50 and into engagement with remaining grooved roller 74.

Following the foregoing operations, trunnion 64 is reassembled with the side plates 68 and 70 and, likewise, grooved roller 72 is reassembled. Then the bearing blocks 56 are reconnected to space block 46 and the cable 18 then is enclosed between the grooved guide rollers 72 and 74. The pin 82 next is restored to its operative position so as to support its rotatable member 80 and the guide bar 28 which was removed similarly is remounted in its operative position relative to upright plates 26. Filler member 20 also is reconnected to end member 14 so as to close the space 16 and once more render the entire frame 10 rigid. The removal and the reinstallation of the above mentioned parts or components consumes very little time and is easily achieved by simple tools of minimum number.

From the foregoing, it will be seen that the present invention comprises a very rugged and durable control device for various sizes of cables to be coiled upon a reel in evenly disposed layers. As the coils of cable build up upon reel, the supporting means 30 automatically will be moved along guide bars 28 and 29 so as to accommodate the increase in diameter of the coiled cable. Meanwhile, an operator, by means of hand wheel 86 guides the coiling of each layer of cable upon the reel 12 by moving the cable engaging and guiding unit 44 longitudinally in opposite directions along supporting means 30. The grooved rollers 72 and 74, together with side plates 68 and 70, may pivot as dictated by the direction of cable 18 relative to the axis of trunnions 64 and 66. The rollers 42 insure accurate guiding of the supporting means 30 in transverse direction across frame 10, while the rollers 62 on unit 44 insure easy guided movement of the unit longitudinally along supporting means 30 in directions transverse to those in which the supporting means 30 move relative to frame 10.

While the invention has been shown and illustrated in its preferred embodiment, and has included certain details, it should be understood that the invention is not to be limited to the precise details herein illustrated and described since the same may be carried out in other ways falling within the scope of the invention as claimed.

I claim:

1. A control device for a reeling machine including a reel for cable and the like and having a pair of parallel guide bars positioned adjacent opposite ends of said reel and receiving cable therebetween; in combination with a frame extending between said guide bars and comprising a pair of substantially parallel U-shaped channels facing each other and spaced apart; means on opposite ends of said frame respectively engaging said guide bars for movement of said frame therealong; a cable guiding unit mounted between and movable longitudinally along the channels of said frame, said unit including a base member positioned between said channels and having a pair of axle means also extending between and projecting from opposite sides of said base member into said channels, rollers rotatably supported upon the ends of said axle means and positioned within said channels for rotation therein to support said guiding unit for movement along said frame, said channels maintaining said rollers upon said axle means and said base member having a cable-receiving opening substantially centrally thereof, means pivotally connected to said base member for movement about an axis parallel to said frame, and a pair of grooved guide pulleys rotatably carried by said pivotally connected means at opposite sides of the axis of said cable-receiving opening and the grooves of said pulleys cooperating to confine a cable therebetween; and propelling means engaging said cable guiding unit and operable to move the same longitudinally along the channels of said frame.

2. The control device set forth in claim 1 further characterized by said propelling means comprising pairs of ears at each end of said frame, each ear of each pair being connected respectively to the channels of said frame, a pin extending between one pair of ears, a shaft extending between the other pair of ears, a sprocket gear rotatably supported by said pin and another sprocket gear fixed to said shaft, a sprocket chain extending around said sprocket gears and the ends thereof being connected to opposite ends of said cable guiding unit, and manually actuatable means fixed to one end of said shaft and operable to move said sprocket chain and propel said cable guiding unit along said supporting frame as desired in opposite directions.

3. The control device set forth in claim 1 further characterized by said base member being U-shaped and the sides thereof respectively being substantially parallel to said channels, bearing block means connected to said base member and rotatably supporting trunnions connected to said pulley supporting means, one of said bearing block means extending across the open end of U-shaped base member, and means removably securing said one bearing block means to said base member, whereby the same may be removed to dispose a cable within the cable-receiving opening in said member.

References Cited in the file of this patent

UNITED STATES PATENTS

| Number | Name | Date |
| --- | --- | --- |
| 1,595,386 | Earley | Aug. 10, 1926 |
| 1,649,184 | Posey | Nov. 15, 1927 |
| 1,935,585 | Tornblom | Nov. 14, 1933 |
| 2,121,870 | Greene | June 28, 1938 |
| 2,135,072 | Forster | Nov. 1, 1938 |
| 2,226,017 | Pixley | Dec. 24, 1940 |
| 2,452,297 | Gaye | Oct. 26, 1948 |
| 2,473,628 | Allison | June 21, 1949 |
| 2,478,486 | Holleron | Aug. 9, 1949 |
| 2,495,039 | Tuel | Jan. 17, 1950 |
| 2,599,423 | Ziegler | June 3, 1952 |
| 2,660,382 | Wilson | Nov. 24, 1953 |